United States Patent
Cleasby et al.

(10) Patent No.: US 7,240,126 B1
(45) Date of Patent: Jul. 3, 2007

(54) METHOD AND SYSTEM FOR PARSING FOR USE IN A SERVER AND WEB BROWSER

(76) Inventors: Andrew Cleasby, 18 Walnut St., Marblehead, MA (US) 01945; Ryan Schuft, 111 Locust St., B59 A-3, Woburn, MA (US) 01801

( * ) Notice: Subject to any disclaimer, the term of this patent is extended or adjusted under 35 U.S.C. 154(b) by 641 days.

(21) Appl. No.: 10/091,997

(22) Filed: Mar. 5, 2002

(51) Int. Cl.
*G06F 15/16* (2006.01)

(52) U.S. Cl. .................. 709/246; 715/523; 715/513

(58) Field of Classification Search ........ 709/246–247, 709/217, 203; 715/523, 513
See application file for complete search history.

(56) References Cited

U.S. PATENT DOCUMENTS

| | | | |
|---|---|---|---|
| 6,167,441 A * | 12/2000 | Himmel ................... 709/217 |
| 6,342,907 B1 * | 1/2002 | Petty et al. ................ 715/762 |
| 6,404,445 B1 * | 6/2002 | Galea et al. ............... 715/853 |
| 6,430,624 B1 * | 8/2002 | Jamtgaard et al. ......... 709/246 |
| 6,535,896 B2 * | 3/2003 | Britton et al. .............. 715/523 |
| 6,638,315 B2 * | 10/2003 | Uppiano et al. ............ 715/513 |
| 6,763,382 B1 * | 7/2004 | Balakrishnan et al. ...... 709/224 |
| 6,772,200 B1 * | 8/2004 | Bakshi et al. ................ 709/217 |
| 6,829,745 B2 * | 12/2004 | Yassin et al. ................ 715/513 |
| 6,880,014 B2 * | 4/2005 | Brown et al. ................ 709/227 |
| 6,957,394 B1 * | 10/2005 | Fernandez et al. .......... 715/760 |
| 7,032,167 B1 * | 4/2006 | Cleasby et al. .............. 715/500 |
| 2002/0049815 A1 * | 4/2002 | Dattatri ...................... 709/206 |
| 2002/0059458 A1 * | 5/2002 | Deshpande et al. .......... 709/246 |
| 2002/0097268 A1 * | 7/2002 | Dunn et al. .................. 345/760 |
| 2002/0112049 A1 * | 8/2002 | Elnozahy et al. ........... 709/224 |
| 2003/0009452 A1 * | 1/2003 | O'Rourke et al. ............. 707/3 |
| 2003/0023628 A1 * | 1/2003 | Girardot et al. ............. 707/513 |
| 2003/0056173 A1 * | 3/2003 | Copenhaver et al. ....... 715/513 |
| 2003/0140284 A1 * | 7/2003 | Dettinger et al. ............. 714/48 |
| 2003/0212686 A1 * | 11/2003 | Chu-Carroll et al. ....... 707/100 |

* cited by examiner

*Primary Examiner*—Abdullahi Salad
(74) *Attorney, Agent, or Firm*—Sierra Patent Group, Ltd.

(57) ABSTRACT

The present disclosure presents a system for parsing based upon content type, and provides a content-rich set of parsing rules that can be optimized for a wide variety of applications. The present system also recognizes different types of content in addition to text, such as behaviors, and associates rules to parse a wide variety of content. The parser may be downloaded to a number of clients by the server, and content may be parsed locally by the clients in a manner similar to the server.

27 Claims, 5 Drawing Sheets

METHOD AND SYSTEM FOR PARSING FOR USE IN A SERVER AND WEB BROWSER

BACKGROUND

1. Field of the Disclosure

The disclosure relates generally to data communications, and in particular, to specifying a parser on a server, and transferring and reconstructing the parser to a client.

2. The Prior Art

Background

Upstream Proxy servers are known in the art and provide an interface between a web client and a server by making requests on the client's behalf and modifying the content that is received before it is presented back to the client. Upstream proxy servers enable browsers to make normal requests to the proxy, which then makes the request from the content server. One application in which proxy servers are useful is a real-time web collaboration environment, where multiple clients are viewing the same cached page that must be dynamically updated, such as a page presenting stock quotes.

As is known by those of ordinary skill in the art, upstream proxy servers are to be distinguished from a "transparent" HTTP proxy, which is recognized specifically as a proxy server by the browser, allowing requests to be submitted in a different fashion. The user of a transparent proxy never sees a difference in the page they receive, i.e., the links are not modified.

One issue with upstream proxy servers is that any links that appear on pages must link back to the proxy server, and not the actual source of the content. To accomplish this, typical proxy servers must perform parsing on the web content prior to presenting the content to the requesting users. Parsing typically involves downloading the requested content, parsing the content to find any embedded links, modifying the links to point back to the proxy server rather than the content source, perform any further content transformation necessary, and then forward the content to the requesting client.

A further challenge to parsing is the increasing use of Java script pages, which allow the generation of web pages dynamically within the receiving client's web browser. Such pages may generate their own links within the browser page which must be parsed and re-directed to the proxy server. Typically, such server-based parsing routines are hard-coded as procedures provided with a specific product, and are not easily extensible or modified.

BRIEF DESCRIPTION OF THE DRAWING FIGURES

DETAILED DESCRIPTION

Figure 1:
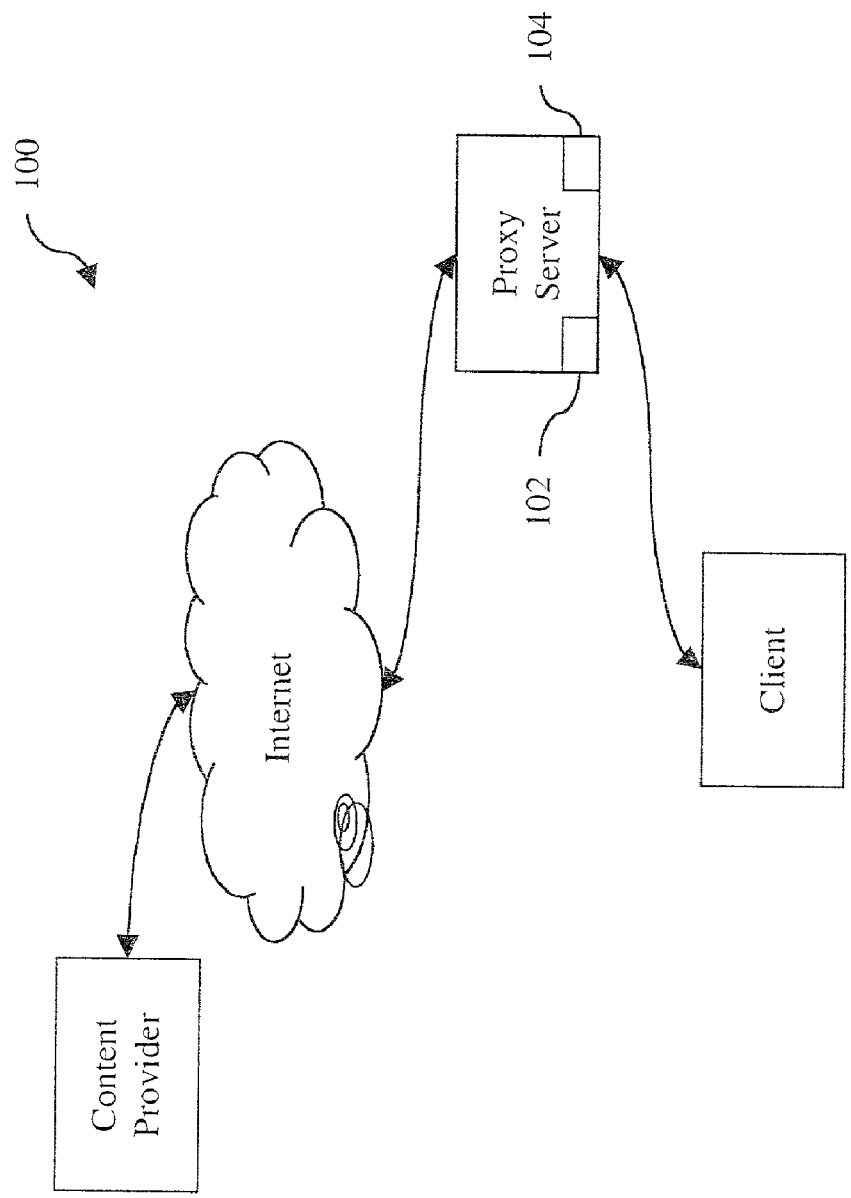
FIG. 1 is a diagram of a data communication system including a proxy server configured in accordance with this disclosure.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

FIG. 1 is a diagram of a proxy server system 100 configured in accordance with the teachings of this disclosure. The system 100 includes a content server for providing content to the Internet. The system 100 also includes a client that is coupled to the Internet through a proxy server. The proxy server may include memory 102 and a processor 104 as is known in the art for the storage, retrieval, and execution of embodiments of this disclosure. The proxy server contains a parser that is configured to parse content requested by the client in accordance with the teachings of this disclosure as will be described in more detail below.

In one aspect of this disclosure, the parser of this disclosure is contained in an XML file that contains the parser structure and behavior. The server may read this file and build the parser upon startup.

It is contemplated that the parser may adhere to a specific structure, which may then be used to determine structure of the parser at runtime. In one aspect, when instantiated, a tree-like structure representing the various configured parsers may be created. The structure reflects the hierarchical relationships between configured parsers, and is used to select the appropriate parser for a single request at parse-time. Additionally, the parser may contain script that may be executed during document reformatting to precisely control the reformatting process.

The parser of this disclosure introduces an element known as a metamatch. As the server initializes, it builds the metamatch element. The metamatch element contains one or more parsing objects, known as metamatch objects. Each metamatch object may contain one or more rule objects for parsing individual types of content, or sources of content. Thus, depending on the types of rules in a particular metamatch, metamatches may be optimized to parse a page from a particular source, or be more general and optimized to parse only a specific type of content. When constructed using a flexible language such as XML, many metamatch objects can be defined, and the metamatches may be related to each other in a hierarchal fashion as is known in the art. By so organizing the metamatches in a hierarchy, when a request comes in from a parser, the proxy server may walk through the metamatches to determine which rule applies to the content that needs to be parsed.

Additionally, as the metamatch element is built upon constituent metamatch objects, more specialized metamatch objects can reside alongside more general metamatches, with the more specialized objects inheriting some of the behavior from the more generalized objects.

The metamatch element may also contain an attribute that used to identify the most appropriate rule to parse content with as parsing requests are received.

In one aspect of this disclosure, the metamatch object comprises an object in Java. It has several attributes, such as the protocol, host, port, path, and contenttype, including comma separated lists of respective portions of the inbound request's meta data (the requested URL, the document type, etc). These may be used when linking a metamatch object with a metasearch object, allowing the parser to branch through the trees of rules.

Rule objects may also be defined in XML. The rule objects may contain an attribute that is a comma separated list of rule names which should be excluded from the tree that the rule exists in. This allows rules to override rules that were inherited from a parent metamatch object. Additionally, rules may override or deprecate other rules. Deprecated rules are effectively deleted from the metamatch that is created with the new Rule.

Figure 2:
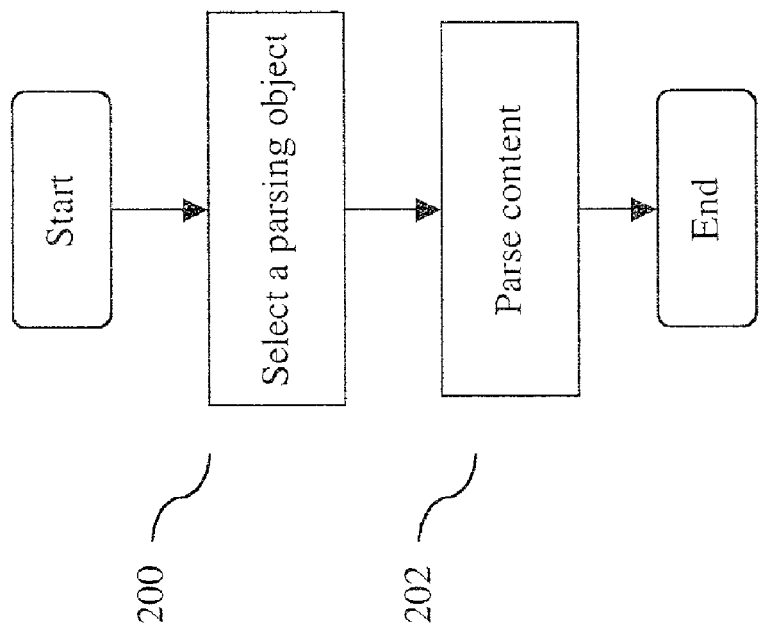
FIG. 2 is a flow diagram of parsing received content in accordance with the teachings of this disclosure.

FIG. 2 is flow diagram of a parsing method in accordance with this disclosure. In performing the parsing, it will be assumed that the parser is built after the server initializes as mentioned above. The parser may be built at any time prior to the first parse request. After a request is made by the client, content arrives at the proxy server, initiating the parsing process.

Moving first to act 200, a metamatch object is selected that best applies to the received content. This may be accomplished using the parsing expression as described above.

After the selected metamatch object is identified, the content may be parsed in act 202. In one aspect, the content may be parsed in two steps.

The content may be first broken down into smaller pieces of text using one or more rule regular expressions. All expressions are combined into a large top-level expression, with one top-level expression being associated with a metamatch. In one aspect, the parsing process works by repeatedly applying the regular expression to the input, looking for the first best match in the input each time, then continuing from the end of the last match, until the end of the input is reached. The text is divided into fragments, with some fragments being text that matched a specified Rule, other fragments being the text in between matched fragments. In a further aspect, the text is only parsed once, after which the appropriate Rule scripts may act on it.

These smaller text objects may then be parsed according to the expressions in the rule objects contained in the selected metamatch object. The result of this process is a tree structure containing the parser rules and their associated text object. The process may then move to act 206, where the proxy server iterates through the tree, executing the rules and reformatting the document. As each rule is executed, an associated rule script may be called and executed to reformat the content.

In a further aspect, various Rule scripts are provided which can execute at several different points in the parsing/reformatting process. For example, there are onBeforeParse, onAfterParse, onBeforeRender, and onAfterRender scripts available at the metamatch level. At the Rule level, there are onMatch and onRender scripts. It is contemplated that most reformatting may be done at the Rule-level onRender script, where, for example, a link is reformatted to point to the proxy server. For some HTML tag types, like a Base Href, an onMatch script is necessary to dynamically affect the parsing behavior as the document is being parsed.

Finally, the parsed objects may be written out into an output document. The output document may then be flattened out into a string and sent out to the client.

Thus far parsing on the server side has been described. It is contemplated that parsing on the client side may advantageous as well. Such an embodiment will now be disclosed.

Figure 3:
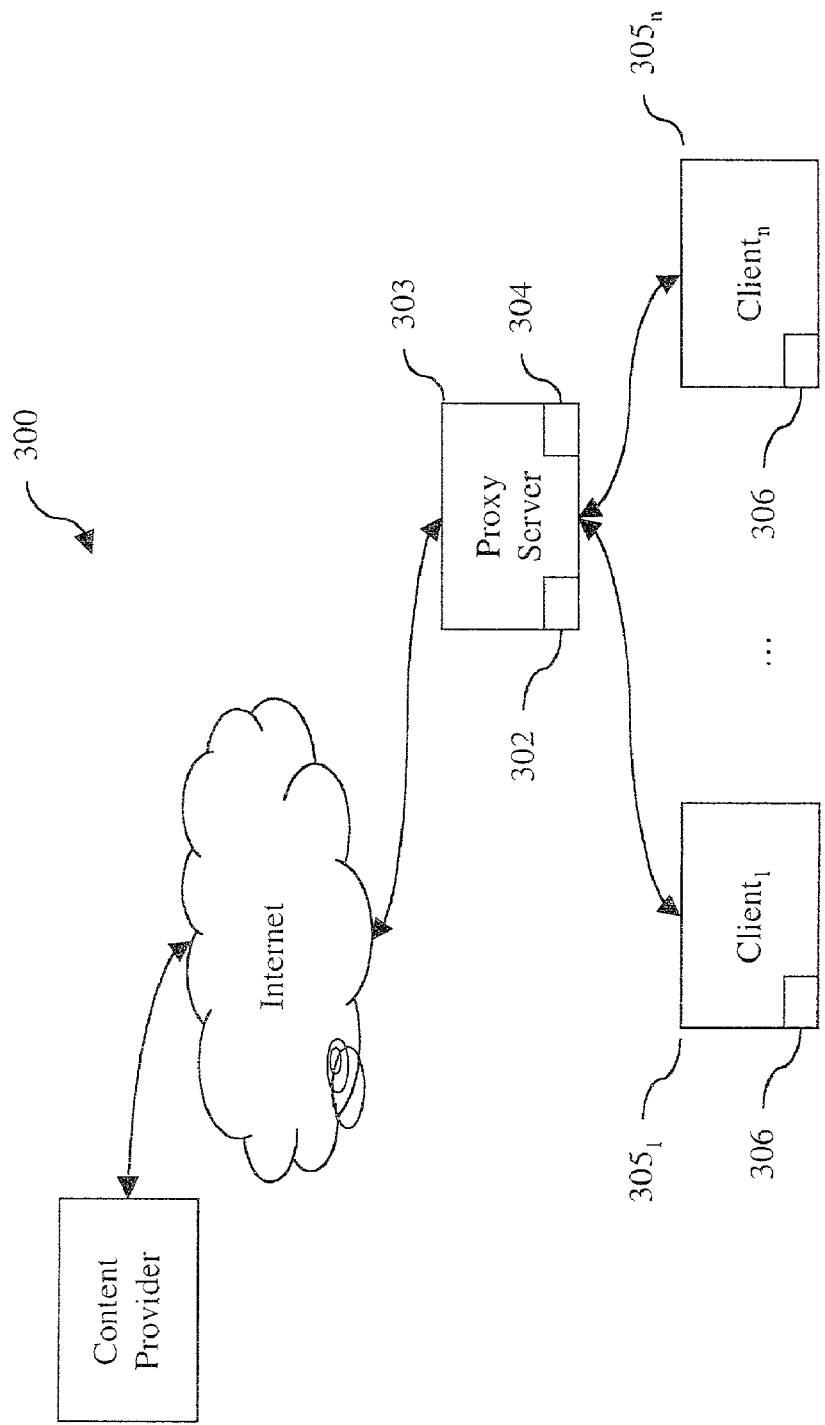
FIG. 3 is a diagram of a data communication system including a proxy server coupled one or more clients configured to parser content locally in accordance with this disclosure.

FIG. 3 is a diagram of a proxy server system 300 configured in accordance with the teachings of this disclosure. The system 300 includes a content server for providing content to the Internet. The system 300 also includes at least one client $305_1$ through $305_n$ coupled to the Internet through a proxy server 303. The proxy server 303 may include memory 302 and a processor 304 as is known in the art for the storage, retrieval, and execution of embodiments of this disclosure. The proxy server contains a parser that is configured to parse content requested by the client in accordance with the teachings of this disclosure. The clients $305_1$ through $305_n$ may comprise a personal computer as is known on the art suitable for operating a web browser, and also includes a parser 306 as will be described below.

In one aspect of a disclosed parser system, the parser code as disclosed above is also transferred to clients of the proxy server, allowing content to be parsed on the client in the same manner as was described above for parsing on the server. In this embodiment, the parsing code is constructed using a combination of Java and JavaScript, where Java provides the framework and JavaScript controls the reformatting behavior. It is contemplated that other languages may also be employed, such as VBScript or C#. The choice of language may depend on the particular environment where the code is to be executed.

Figure 4:
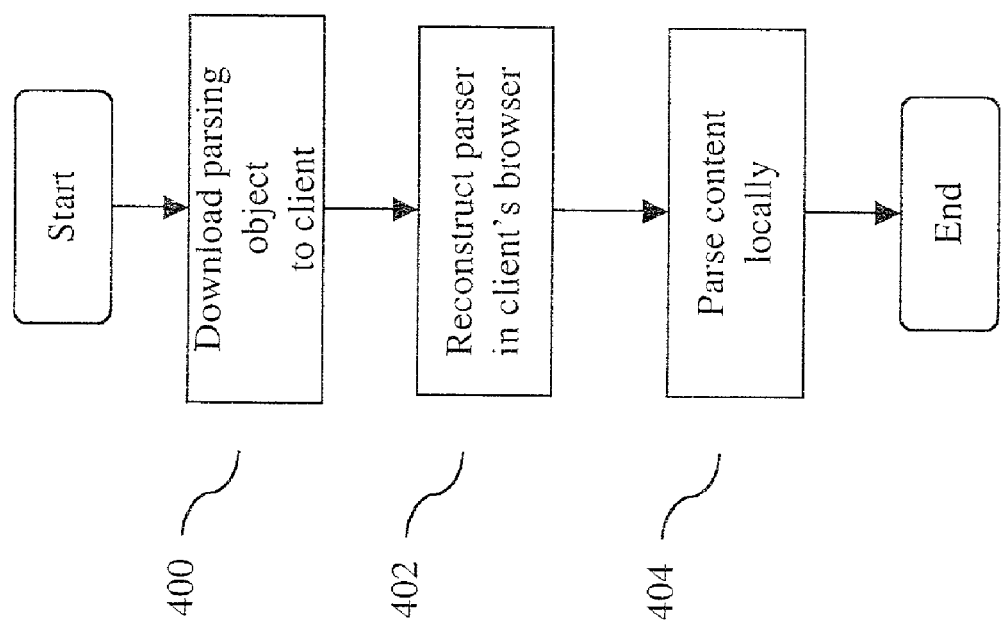
FIG. 4 is a flow diagram of locally parsing received content by a client in accordance with the teachings of this disclosure.

FIG. 4 is a flowchart of a method of parsing in accordance with the teachings of this disclosure. The processes of FIG. 4 begins in act 400 where the parser as disclosed above is downloaded by a client from a server. It is contemplated that the parser may be downloaded as a collection of Java classes and a serialized Java object. The downloading may occur during the web session setup. It is contemplated that the same code as is used to construct the server parser may be downloaded to the client.

The process may then move to act 402, where the parser is reconstructed locally in the client. During this reconstruction, all necessary state and instance information from the server parser may be installed in the client. The reformatting behavior may be sent to the client's browser in a web page as JavaScript.

Once the parser is reconstructed, the client is then able to locally parse received content in act 404. Once the Java and JavaScript representing the parser is delivered to the client, links may be made from the Java parser to the JavaScript representing the reformatting behaviors as described above. When received content is parsed locally in the client, a call may be made into the Java parser, which then can execute and parser the content. The parsed document object may then be reformatted by calling into the various JavaScript reformatting functions.

Figure 5:
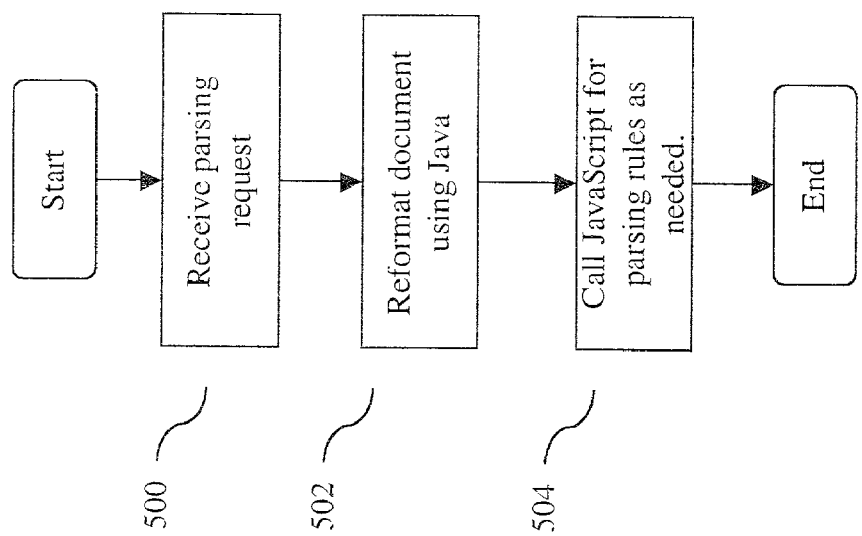
FIG. 5 is a further flow diagram of locally parsing received content by a client in accordance with the teachings of this disclosure.

FIG. 5 is a further flow diagram of parsing in accordance with the teachings of this disclosure. FIG. 5 shows the interaction between components in a client as parsing occurs. The sequence starts in act 500, where a parsing request is received. The process then moves to act 502, where parsing moves to the Java portion of the client-side parser. As the document is reformatted, a call may be placed into JavaScript for each rule script as needed in act 504. The process in FIG. 5 may be repeated as often as necessary to parse the received content.

FIG. 5 thus discloses a method of communicating between Java code and JavaScript functions emulating the behavior of the server version of the parser on the client.

As will be appreciated by those skilled in the art, a key feature of the disclosed parser can "hook-in" to client-side writing of a document. Such content is frequently generated in the client, meaning that prior art server-side parsing and processing may not be sufficient. It is contemplated that any language may be employed as long as the disclosed parser can "hook-in" to the process of writing a document into the client.

Thus, using the teachings of this disclosure, content may be parsed in the same way as it would have been on the server. This local parsing aspect provides many advantages. For example, the teachings of this disclosure provides for consistent parsing behavior throughout a client/proxy server system as data is parsed on either the client or the server in the same manner. Thus, users of the proxy server can be assured of predictable parsing behavior.

Furthermore, the teachings of this disclosure reduce the maintenance of the parsing code. Since the same code can be utilized on both the server and client, maintaining a separate client codebase can be substantially reduced or eliminated. This can greatly reduce maintenance and troubleshooting.

Additionally, the teaching of this disclosure provide for a single source for parser extensions and modifications. The document parser of this disclosure may be quickly modified or customized to address unique content issues. As the same code may be used to provide both the server and client parsers, changes only need to be made in a single location, greatly reducing the likelihood of errors or inconsistencies.

While the aspects disclosed herein deal with HTTP content, the disclosed parser may also be usable in a more general sense to parse any arbitrary content. This may be useful where it is desirable to offload parsing responsibilities from a server to distribute the processing load.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A method of parsing content received by at least one client coupled to a server, said method comprising:
   receiving, by at least one client, a parser from a server;
   reconstructing said parser in a web browser operating in said at least one client;
   selecting, by said at least one client, a parsing object corresponding to said received content, said parsing object containing at least one parsing rule having at least one expression; and
   parsing the received content according to said at least one parsing rule by said at least one client, wherein said parsing the received content includes the acts of:
      parsing said received content using a Java portion of the client-side parser, and
      placing a call, as needed, into JavaScript for a rule script.

2. The method of claim 1, wherein said parser is received by said at least one client as a collection of Java classes and a serialized Java object.

3. The method of claim 1, wherein the act of receiving, by at least one client, a parser from a server occurs at any time prior to a first parse request.

4. The method of claim 1, further including the act of combining said at least one expression into a top-level expression.

5. The method of claim 4, further including the acts of applying said top-level expression to said received content; determining the first best match in the input; and continuing from the end of the last match until the end of said received content is reached.

6. The method of claim 5, further including the act of dividing said received content into fragments of test, wherein at least some of said fragments comprises text matching a specific one of said at lease one parsing rule.

7. The method of claim 6, further including the act of defining a tree structure containing said at least one parsing rules and their associated text object.

8. The method of claim 7, further including the acts of iterating through said tree; executing said rules; and reformatting said received content.

9. The method of claim 8, wherein as each said rule is executed, an associated rule script is called and executed to reformat said received content.

10. The method of claim 8, wherein said rule scripts may be executed at predetermined points in the reformatting process.

11. The method of claim 8, where said rule scripts may be executed at predetermined points in the parsing process.

12. A program storage device readable by a machine, tangibly embodying a program of instructions executable by the machine to perform a method of parsing content received by at least one client coupled to a server, said method comprising the acts of:
   receiving, by at least one client, a parser from a server;
   reconstructing said parser in a web browser operating in said at least one client;
   selecting, by said at least one client, a parsing object corresponding to said received content, said parsing object containing at least one parsing rule having at least one expression; and
   parsing the received content according to said at least one parsing rule by said at least one client, wherein said parsing the received content includes:
      parsing and received content using a Java portion of the client-side parser, and
      placing a call, as needed, into JavaScript for a rule script.

13. The device of claim 12, wherein said parser is received by said at least one client as a collection of Java classes and a serialized Java object.

14. The device of claim 13, said method further including the act of combining said at least one expression into a top-level expression.

15. The device of claim 14, said method further including the acts of applying said top-level expression to said received content; determining the first best match in the input; and continuing from the end of the last match until the end of said received content is reached.

16. The device of claim 15, said method further including the act of dividing said received content into fragments of text, wherein at least some of said fragments comprise text matching a specific one of said at lease one parsing rule.

17. The device of claim 16, said method further including the act of defining a tree structure containing said at least one parsing rules and their associated text object.

18. The device of claim 17, said method further including the acts of iterating through said tree; executing said rules; and reformatting said received content.

19. The device of claim 13, wherein the act of receiving, by at least one client, a parser from a server occurs at any time prior to a first parse request.

20. An apparatus for parsing content received by at least one client coupled to a server, said apparatus comprising:
   means for receiving a parser from a server;
   means for reconstructing said parser in a web browser operating in said at least one client;
   means for selecting, by said at least one client, a parsing object corresponding to said received content, said parsing object containing at least one parsing rule having at least one expression; and
   means for parsing the received content according to said at least one parsing rule by said at least one client, wherein said means for parsing the received content include:
      means for parsing said received content using a Java portion of the client-side parser, and
      means for placing a call, as needed, into JavaScript for a rule script.

21. The apparatus of claim 20, wherein said parser is received by said at least one client as a collection of Java classes and a serialized Java object.

22. The apparatus of claim 21, said method further including means for combining said at least one expression into a top-level expression.

23. The apparatus of claim 22, said method further including means for applying said top-level expression to said received content; means for determining the first best match in the input; and means for continuing from the end of the last match until the end of said received content is reached.

24. The apparatus of claim 23, said method further including means for dividing said received contact into fragments of text, wherein at least some or said fragments comprise text matching a specific one of said at lease one parsing rule.

25. The apparatus of claim 24, said method further including means for defining a tree structure containing said at least one parsing rules and their associated text object.

26. The apparatus of claim 25, said method further including means for iterating through said tree; executing said rules; and reformatting said received content.

27. The apparatus of claim 21, wherein the act of receiving, by at least one client, a parser from a server occurs at any time prior to a first parse request.

* * * * *